(No Model.)
W. J. GROUNDS.
SNOW SCRAPER.
No. 389,298. Patented Sept. 11, 1888.
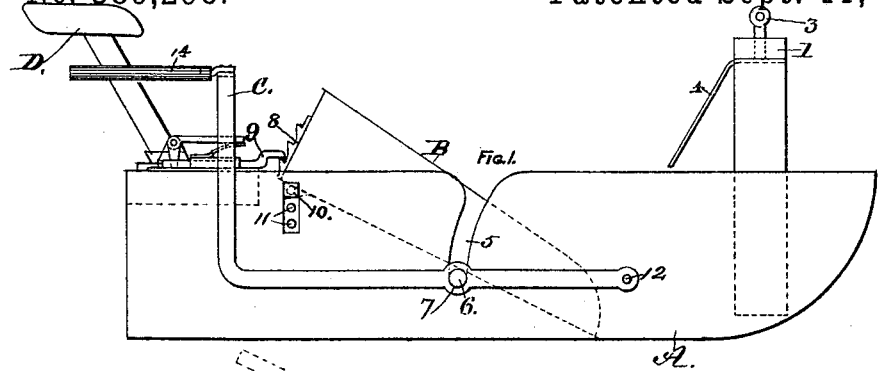
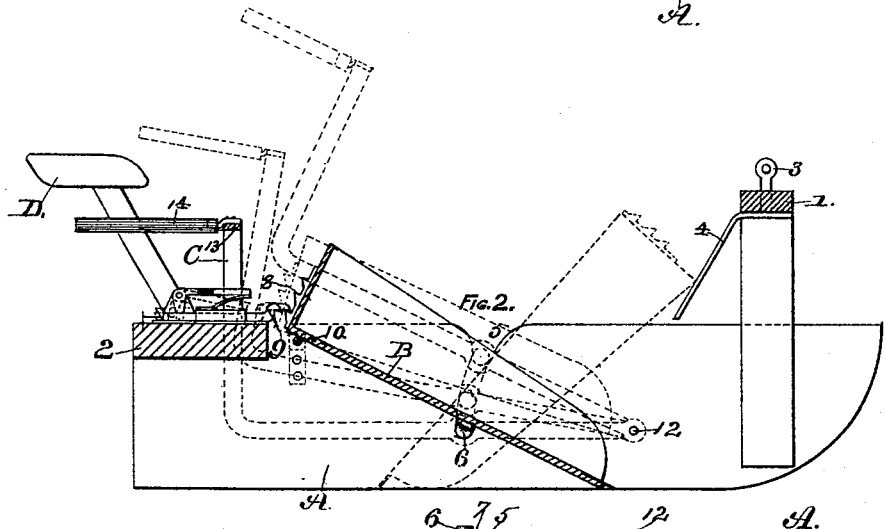
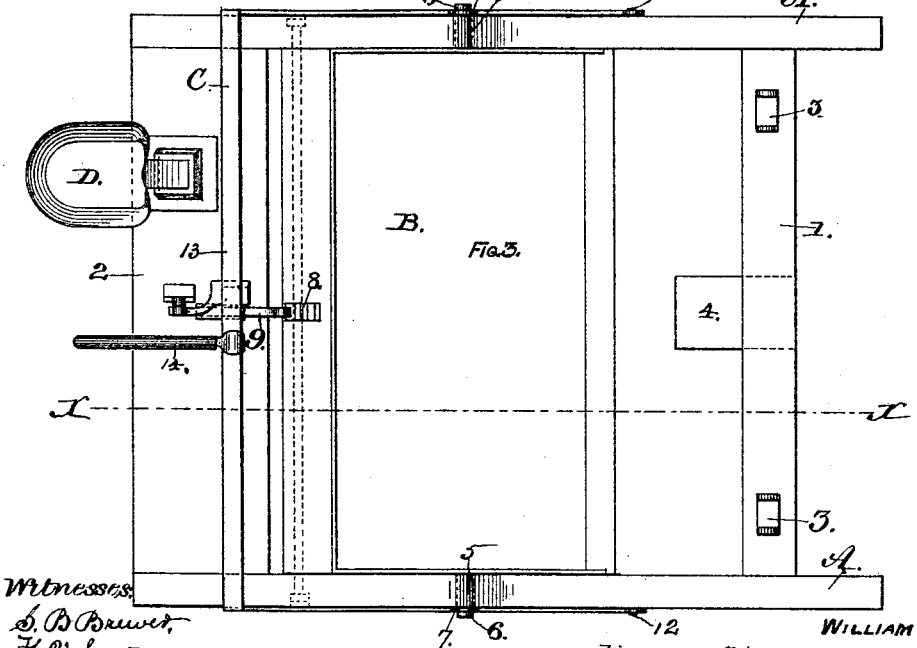
Witnesses:
S. B. Brewer,
H. V. Scattergood.
Inventor:
William J. Grounds,
by William H. Low,
Attorney.

United States Patent Office.

WILLIAM J. GROUNDS, OF WATERVLIET, NEW YORK.

SNOW-SCRAPER.

SPECIFICATION forming part of Letters Patent No. 389,298, dated September 11, 1888.

Application filed February 10, 1888. Serial No. 263,558. (No model.)

*To all whom it may concern:*

Be it known that I, WILLIAM J. GROUNDS, of Watervliet, in the county of Albany and State of New York, have invented new and useful Improvements in Snow-Scrapers, of which the following is a specification.

My invention relates to improvements in the class of snow-scrapers that is used for removing snow from a field of ice as a preparatory step to the cutting, harvesting, and storing the ice; and the object of my invention is to provide a simple and effective machine for the above-named purpose. This object I attain by the mechanism illustrated in the accompanying drawings, which are herein referred to and form part of this specification, and in which—

Figure 1 is a side elevation of my scraper with its inclined face-board arranged in position for scraping. Fig. 2 is a longitudinal section at the line X X on Fig. 3, with the position of the face-board arranged for dumping its load indicated by dotted lines; and Fig. 3 is a plan view of Fig. 1.

As represented in the drawings, A designates the runners, on which the scraper, loaded or empty, is moved from place to place, as occasion may require. Said runners are connected together at their forward end by a cross-frame, 1, and at their rearward end by a cross-beam, 2, said cross-frame being provided with eyes 3, to which the shafts or appliance for the horse or horses is attached, and with a stop, 4, for a purpose hereinafter explained. Each of the runners A has a curved slot, 5, which is open at the upper side of the runner.

B is the inclined face-board or scraper, by which the scraping up of the snow is effected. Said face-board is provided with oppositely-located trunnions 6, which have an up-and-down movement in the slots 5 of the runners. Said trunnions are also fitted to rock in the eyes 7, formed in the operating-lever C.

The face-board B has on its rearmost side a catch-piece, 8, which is preferably provided with a series of projections for the purpose of an adjustment of said face-board to different angles of inclination, and said catch-piece is fitted to engage with a spring-latch, 9, that is secured to the cross-beam 2, for the purpose of holding the face-board from tilting while engaged in the operation of scraping. The rearward part of said face-board is supported on a cross-rod, 10, which is fitted to enter either one of a series of holes, 11, which are formed in the runners A and are arranged to correspond in height to the variable projections on the catch-plate 8. The operating-lever C is bifurcated, so that one limb of the same will be arranged at the outer side of each of the runners A, and will be fulcrumed to the latter, as at 12. The cross-bar 13 of said lever, which passes over the top of the runners, is provided with a rearwardly-projecting handle, 14, by which said lever is operated to raise and depress it when occasion requires.

D is the driver's seat, which is placed on the cross-beam 2, so as to bring the spring-latch 9 within easy reach of the driver's foot and leave the handle 14 in convenient distance of his hand.

The operation of my scraper is as follows: The face-board B being arranged at a required angle and secured as shown in Figs. 1 and 2, the scraper is drawn forward until the required load of snow has been accumulated on the face-board B. When this is accomplished, the forward edge of said face-board is elevated to about the position shown by dotted lines in Fig. 2 before the face-board is tilted over by raising the handle 14 while the spring-latch 9 is yet engaged with the projections of the catch-piece 8, and while the load of snow is borne on said face-board while still in the position last described the scraper is drawn to the dumping-ground. On reaching the latter the driver allows the scraping-edge of said face-board to drop to its normal position, as shown by the full lines of Fig. 2, where it will be in contact with the surface of the snow on the dumping-ground and will meet with the resistance due to such contact. The driver next releases the spring-latch 9 from the projections of the catch-piece 8 and at the same time raises the handle 14 to elevate the operating-lever C into the higher position, (indicated by dotted lines in Fig. 2,) and while this is being effected the forward movement of the scraper aids in tilting over the face-board B into a position (indicated by dotted lines in Fig. 2) where its rearmost part will strike the stop 4 and prevent said face-board from being tilted over too far. The face board B is restored to its normal position by the driver, who, to effect this end, raises the handle 14 until the scraping-edge of the face-board is raised far enough to clear the ground, and then by a smart push of his foot against the bottom side of the face-board, near the scraping-edge of the latter, the face board B can be readily restored to its position for scraping.

I claim as my invention—

1. In a snow-scraper, the combination of a sleigh or runners provided with curved slots, a tilting face-board or scraper provided with lateral trunnions which are fitted to slide up and down in said curved slots, and a bifurcated operating-lever which is pivoted to said runners and is provided with eyes in which said trunnions are fitted to rock, as and for the purpose herein specified.

2. In a snow-scraper, the combination of a sleigh or runners provided with curved slots, a tilting face-board or scraper provided with lateral trunnions which are fitted to slide up and down in said curved slots and having a catch-piece on its rearward end, a bifurcated operating lever which is pivoted to said runners and is provided with eyes in which said trunnions are fitted to rock, and a spring-latch that is fitted to engage with said catch-piece, as and for the purpose herein specified.

WILLIAM J. GROUNDS.

Witnesses:
WM. H. LOW,
S. B. BREWER.